US005995806A

United States Patent [19]

Tsubouchi et al.

[11] Patent Number: 5,995,806

[45] Date of Patent: Nov. 30, 1999

[54] RADIO DATA TRANSMITTER AND RECEIVER

[75] Inventors: Kazuo Tsubouchi; Jun Hozumi; Toshiyuki Azuma, all of Miyagi-ken, Japan

[73] Assignee: Kazuo Tsubouchi, Miyagi, Japan

[21] Appl. No.: 08/823,392

[22] Filed: Mar. 19, 1997

[30] Foreign Application Priority Data

Mar. 22, 1996 [JP] Japan .................................... 8-066889

[51] Int. Cl.$^{6}$ ...................................................... H04B 7/00

[52] U.S. Cl. ........................ 455/38.2; 455/38.3; 455/343; 340/825.06; 340/825.54; 340/870.02; 379/106.11

[58] Field of Search ................................. 455/38.2, 38.3, 455/38.5, 39, 343; 379/106.03, 106.04, 106.07, 106.11; 340/825.06, 825.44, 825.47, 825.54, 870.02, 870.03, 870.11, 870.41

[56] References Cited

U.S. PATENT DOCUMENTS

| | | | |
|---|---|---|---|
| 5,008,898 | 4/1991 | Hamatsu et al. | 375/1 |
| 5,481,259 | 1/1996 | Bane | 455/38.3 |
| 5,710,975 | 1/1998 | Bernhardt et al. | 455/38.3 |
| 5,726,646 | 3/1998 | Bane et al. | 455/38.3 |
| 5,734,686 | 3/1998 | Kuramatsu | 455/38.3 |
| 5,838,720 | 11/1998 | Morelli | 455/38.3 |

OTHER PUBLICATIONS

"A Card–size SS Demodulator Using a 2.4GHz Front–end SAW Correlator", *The Institute of Electronics Information and Communication Engineers,* Y. Maruta, et al., pp. 13–18 (with an English translation) printed & published : 1995.

*Primary Examiner*—Paul Loomis
*Assistant Examiner*—Binh K. Tieu
*Attorney, Agent, or Firm*—Brinks Hofer Gilson & Lione

[57] ABSTRACT

A radio data transmitter includes radio switching circuit which is activated in response to first radio signal having a predetermined particular pattern, and a data transmitter unit. The data unit transmits a first radio signal include a carrier modulated by predetermined data from an antenna when supplied with power in accordance with the activation of the radio switching circuit, and subsequently disconnect the power supply. In addition, a radio data receiver includes switch-activation to circuit for transmitting the first radio signal having the predetermined particular pattern, a receiving circuit for receiving the second radio signal including the data from the data transmitter unit activated by the first radio signal having the predetermined particular pattern, and a storage device for storing data received by the receiving circuit.

3 Claims, 7 Drawing Sheets

CODE 1 SEQUENCE

PN CODE

CARRIER

SPREAD SIGNAL

RADIO DATA TRANSMITTER AND RECEIVER

BACKGROUND OF THE INVENTION

1. Field of the Invention

The present invention relates to radio data transmitters and receivers in which power consumption is reduced.

2. Description of the Related Art

Nowadays, research on radio meter-reading systems for power, gas, and so forth is in progress. The radio meter-reading system enables a meter reader to measure consumption of power, gas, and so forth with a radio meter-reading apparatus from an automobile, without going to the place where the meters are installed.

A problem with the above type of conventional system is power consumption of a meter-reading apparatus while in standby mode. In other words, to activate the meter-reading apparatus by radio, the meter-reading apparatus must be standing by (That is in a condition capable of receiving radio waves). Accordingly, a receiving circuit must always be activated. However, maintaining the active state of the receiving circuit increases power consumption. For example, when a meter-reading apparatus is activated by a battery of small capacity, the power consumption of the receiving circuit severely shortens the life of the battery. In particular, since meter-reading apparatus is activated only once a month, it is not preferable that the receiving circuit consume wasted power for the remaining 29 days (or 30 days).

SUMMARY OF THE INVENTION

Accordingly, it is an object of the present invention to provide radio data transmitter and receiver activated for data transmission and reception in accordance with a radio signal, in which power consumed when the transmitter and receiver are in a standby mode is reduced to approximately zero.

According to a first aspect of the present invention, the foregoing object is achieved through the provision of a radio data transmitter comprising: radio switching means which is activated in response to a first radio signal having a predetermined particular pattern; and a data transmitter unit which is supplied with power in accordance with the activation of the radio switching means, wherein the data transmitter unit subsequently transmits a second radio signal including a carrier modulated by predetermined data from an antenna and then switches off its power.

In the radio data transmitter the radio switching means preferably includes a receiving antenna; a surface acoustic wave device to which a signal received by the receiving antenna is applied for extracting a particular pattern included in the signal; an accumulation circuit for accumulating an output power from the surface acoustic wave device; and a switching circuit which is activated when the output power from the accumulating circuit exceeds a constant value.

The surface acoustic wave device may comprise a surface acoustic wave matched filter.

The surface acoustic wave matched filter may include an $Al_2O_3$ substrate, an AlN film formed on the $Al_2O_3$ substrate, and an Al tapping pattern formed on the AlN film.

According to a second aspect of the present invention, the foregoing object is achieved through the provision of a radio data receiver including: switch-activation means for transmitting data having a predetermined particular pattern; receiving means for receiving a first radio signal from a data transmitter activated by the data having the predetermined particular pattern; and storage means for storing the data recieved in the second radio signal by the receiving means.

The switch-activation means may include noise code generating means for generating a pseudorandom noise code; modulation means for modulating a carrier by using the noise code to generate the first radio signal; and an antenna for radiating the first radio signal modulated by the modulation means in the air.

The above-described present invention provides radio data transmitter and receiver in which power consumed when they in a standby mode can be reduced to approximately zero.

DESCRIPTION OF THE PREFERRED EMBODIMENT

By referring to the attached drawings, an embodiment of a remote data retrieval system in accordance with; the present invention will be described below.

Figure 1:
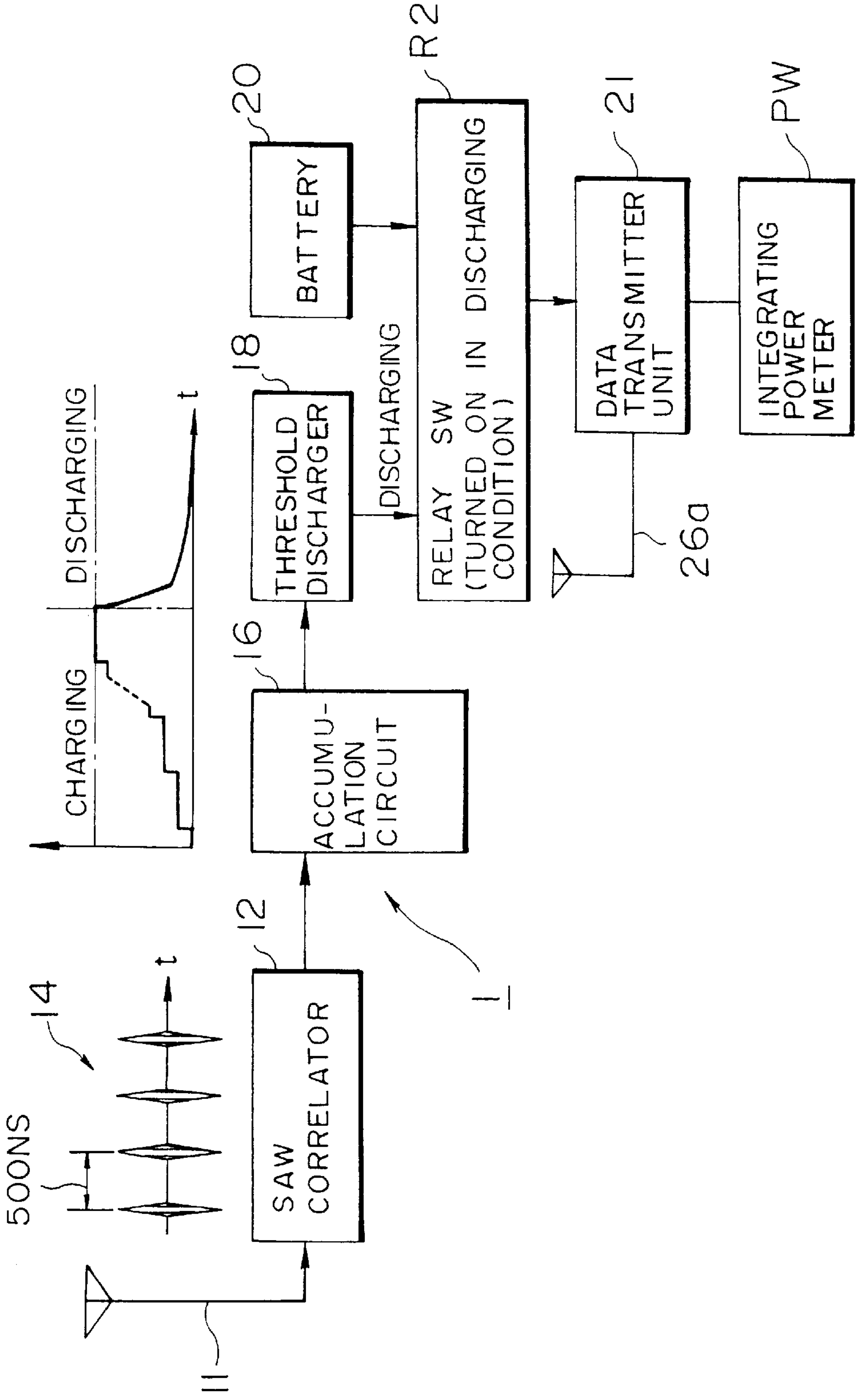
FIG. 1 is a block diagram showing a radio data transmitter according to an embodiment of the present invention.
Figure 2:
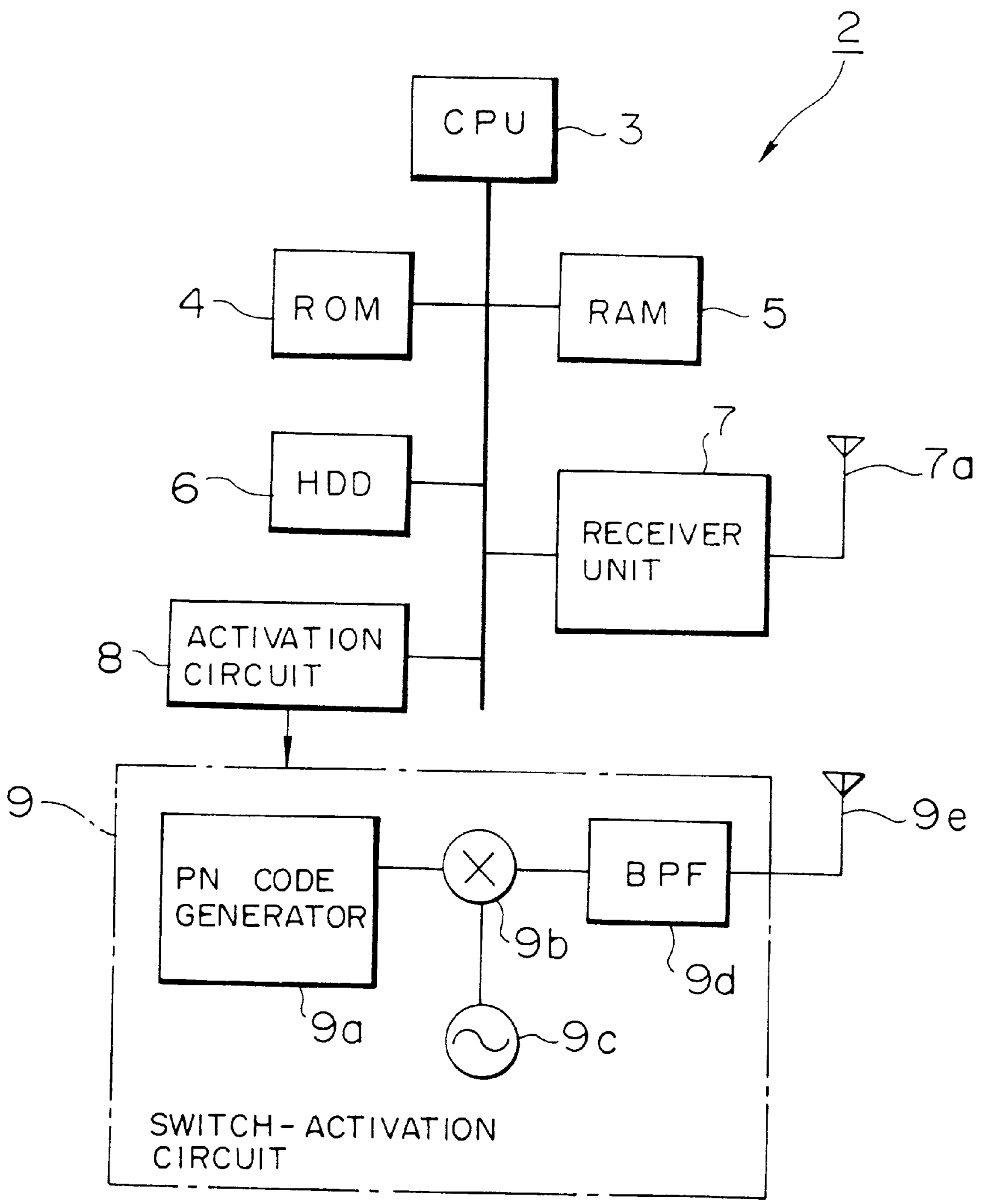
FIG. 2 is a block diagram showing a data collector for activating the radio data transmitter shown in FIG. 1.

FIG. 1 shows a block diagram of a radio data transmitter 1 according to one embodiment of the present invention. FIG. 2 shows a data recorder 2 (radio data receiver) which drives the radio data transmitter 1 from a remote place and records data transmitted from the radio data transmitter 1.

The data recorder 2 shown in FIG. 2 includes a central processing unit (CPU) 3, a read-only memory (ROM) 4 for storing programs used in the CPU 3, a random access memory (RAM) 5 for temporarily storing data, a hard disk drive (HDD) 6, and a receiver unit 7 for receiving data transmitted from the radio data transmitter 1 (shown in FIG. 1). Data received by the receiver unit 7 is recorded by the hard disc drive 6. An activation circuit 8 activates a switch-activation circuit 9. The activation circuit 8 receives an activation instruction from the CPU 3 and switches on the power switch of the switch-activation circuit 9 for operation.

The switch-activation circuit 9 activates the radio data transmitter 1 by spread spectrum communication.

Figures 3A, 3B, 3C:
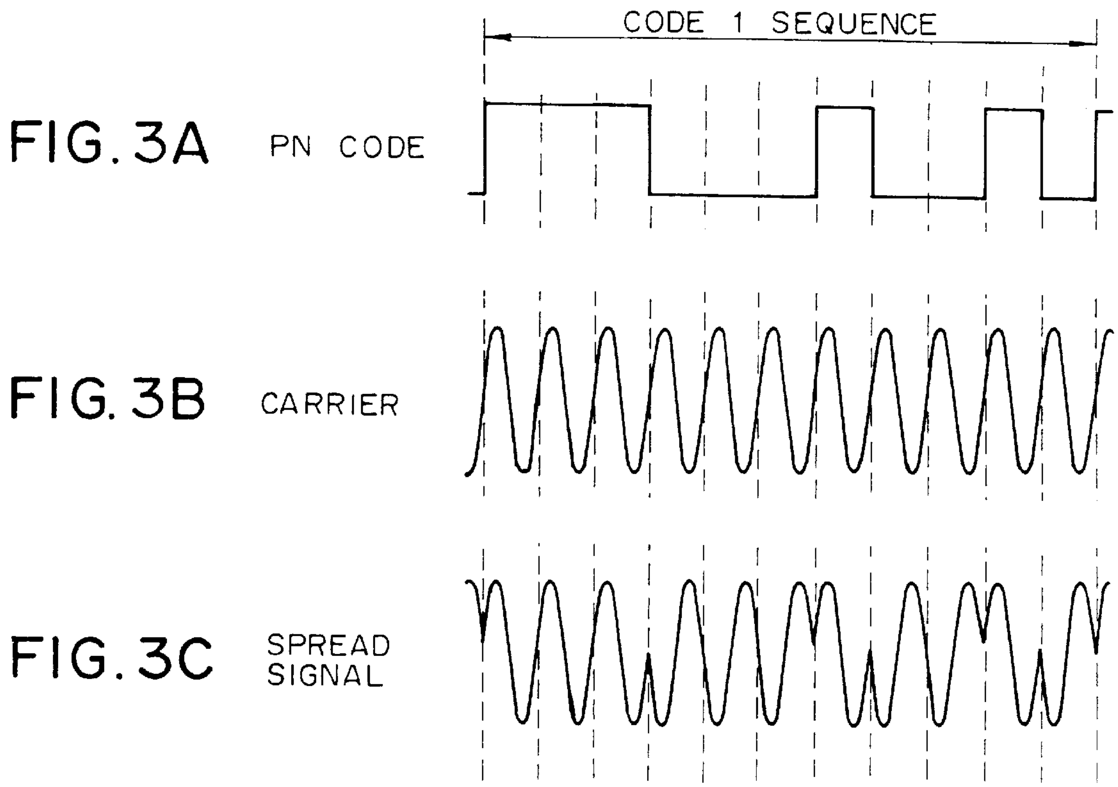
FIGS. 3A to 3C are waveform charts showing signals in portions of a switch-activation circuit.

The switch-activation circuit 9 includes a PN code generator 9*a*. A PN code is a cyclic, pseudorandom noise code. Known PN code are a maximum in length sequence, a Barker sequence, a Gold sequence, and so forth. The PN code generator 9*a* repeatedly generates and outputs a PN code shown in FIG. 3A to a modulation circuit 9*b* during a predetermined period. The PN code shown in FIG. 3A is a 11-bit Barker code, and one cycle of the code is expressed as follows:

11100010010

An oscillation circuit 9*c* generates a carrier. The waveform of the carrier is shown in FIG. 3B. The modulation circuit 9*b* outputs a spread modulated carrier, utilizing the PN code. The output waveform of the modulation circuit 9*b* is shown in FIG. 3C. The output of the modulation circuit 9*b* is radiated from an antenna 9*e* through a band-pass filter 9*d*.

Figure 4:
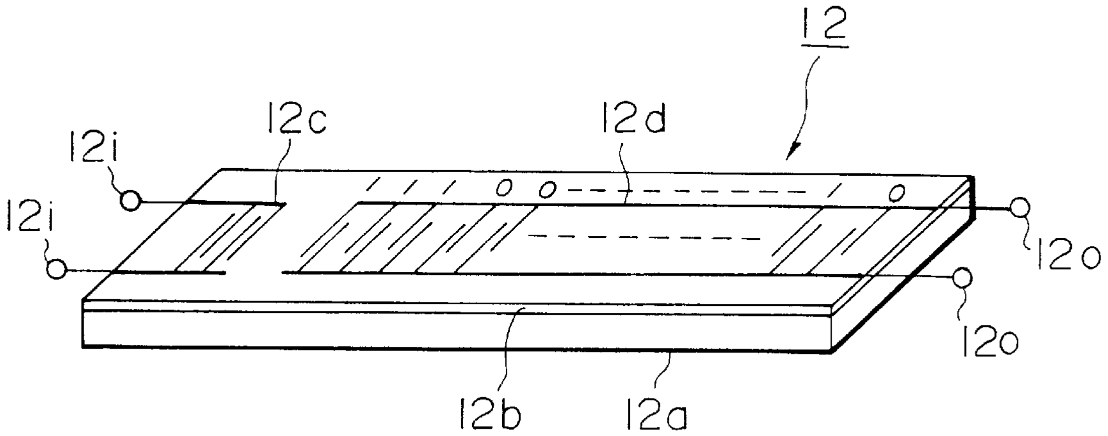
FIG. 4 is a perspective view illustrating a surface acoustic wave correlator shown in FIG. 1.

The radio data transmitter 1 shown in FIG. 1 includes a receiving antenna 11 and a surface acoustic wave (SAW) correlator 12 (SAW matched filter). FIG. 4 shows a perspective view of the SAW correlator 12. The SAW correlator 12 includes a substrate 12*a* comprised of $Al_2O_3$ (sapphire) and an AlN (aluminum nitride) film 12*b* formed on the $Al_2O_3$ substrate by an MO-CVD method. An aluminum (Al) input pattern 12*c* and an Al tapping pattern 12*d* are formed on the AlN film 12*b* by an opto-lithography technique. The Al tapping pattern 12*d* corresponds to the above-mentioned Barker code (11100010010).

When a spread signal shown in FIG. 3C is received by the antenna 11, and is applied to the input pattern 12*c* of the SAW correlator 12, the applied signal becomes a surface acoustic wave, which is conducted by the surface of the SAW correlator 12 through the tapping pattern 12*d*. When the phase of the conducted wave motion coincides with the tapping pattern 12*d*, the amplitude of each wave is integrated, and a correlated peak eleven times the amplitude appears at output ends 12*o* of the tapping pattern 12*d*. In other words, as shown in FIG. 1, correlated peaks 14 appear for eleven cycles of the carrier at the output ends 12*o* of the SAW correlator 12. When the phase of the wave motion does not coincide with the tapping pattern 12*d*, the voltage across the output ends 12*o* is $1/11$ of the correlated peak or less. The outputs of the SAW correlator 12 are inputted to an accumulation circuit 16.

The AlN-on-$Al_2O_3$ structure shown in FIG. 4 has a propagation velocity of approximately 6000 m/second, which is 1.5 to 2 times higher than that of other piezoelectric bodies. This enables a large sized structure to be processed. In addition, the structure has a relatively large electromechanical coupling coefficient of approximately 1%. This provides a propagation period temperature coefficient of zero, so the structure is suitable for a gigahertz-band surface acoustic wave material.

Figure 5:
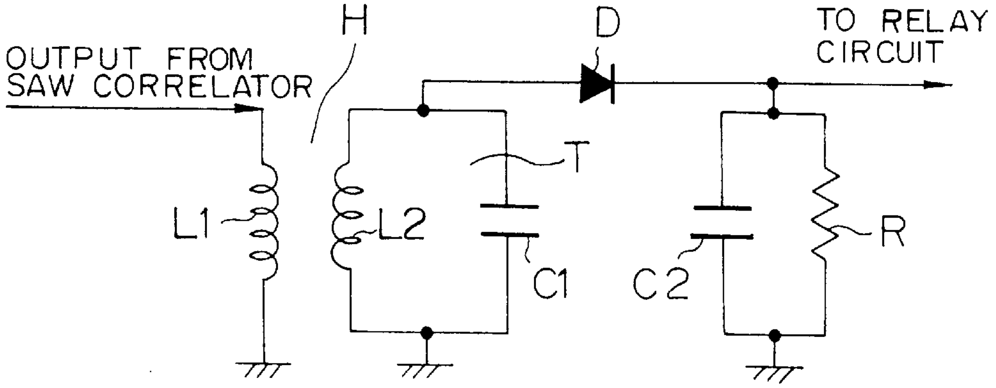
FIG. 5 is a circuit diagram showing an accumulation circuit shown in FIG. 1.

As shown in FIG. 5, the accumulation circuit 16 includes a high frequency coil H comprised of a primary coil L1 and a secondary coil L2, a tank circuit T comprised of the secondary coil L2 and a capacitor C1 which are connected in parallel, a diode D for rectifying the output of the tank circuit T, a capacitor C2 for accumulating the output of the diode D, and a resistor R connected in parallel to the capacitor C2.

Figure 6A:
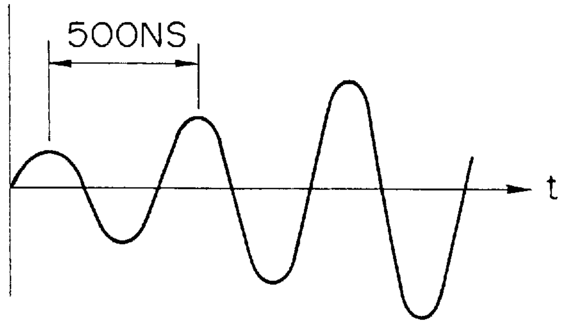
FIGS. 6A and 6B are waveform charts showing signals in portions of the circuit shown in FIG. 5.
Figure 6B:
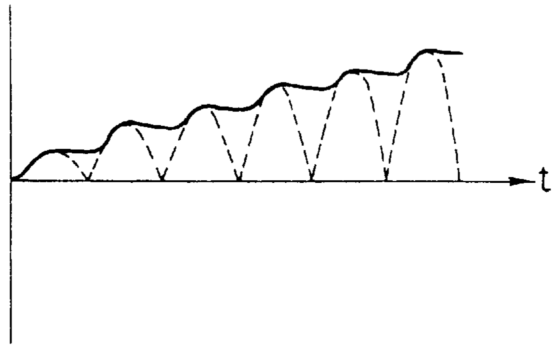

The resonance frequency of the tank circuit T coincides with the frequency (2 MHz) of the correlated peak waveform outputted from the SAW correlator 12. As a result, the tank circuit T accepts only correlated peak components, and sequentially accumulates the components. In FIG. 6A, the voltage between both ends of the capacitor C1 is shown. The output voltage of the tank circuit T charges the capacitor C2 via the diode D. As a result, as shown in FIG. 6B, the voltage between both ends of the capacitor C2 successively increases. The voltage of the capacitor C2 is applied to a threshold discharger 18.

Figure 7:
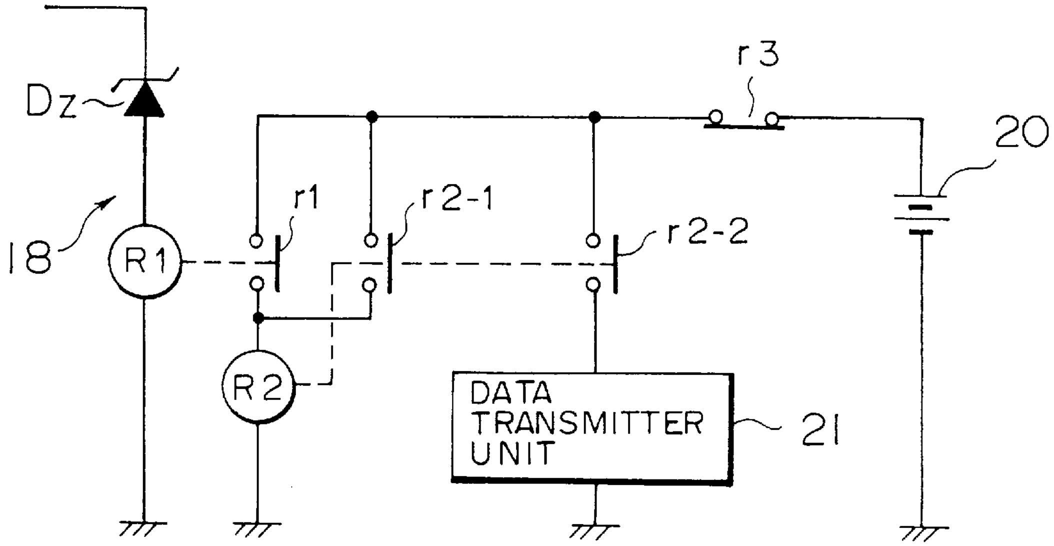
FIG. 7 is a circuit diagram showing details of a threshold discharger and a relay switch, which are shown in FIG. 1.

A configuration of the threshold discharger 18 and the relay switch R2 is shown in FIG. 7. The threshold discharger 18 includes a Zener diode Dz and a relay switch R1 connected in series to the Zener diode Dz. The relay switch R1 consumes a small amount of power (for example, 50 mW). When the output voltage of the accumulation circuit 16 exceeds the Zener voltage of the Zener diode Dz, the Zener diode Dz is switched on to activate the relay switch R1, and a contact r1 is closed. Thereby, the voltage of the battery 20 is supplied to the relay switch R2 to be activated, so contacts r2-1 and r2-2 are closed. When the contact r2-1 is closed, the relay switch R2 is self-held. When the contact r2-2 is closed, the voltage of the battery 20 is supplied to a data transmitting unit 21 to operate.

Figure 8:
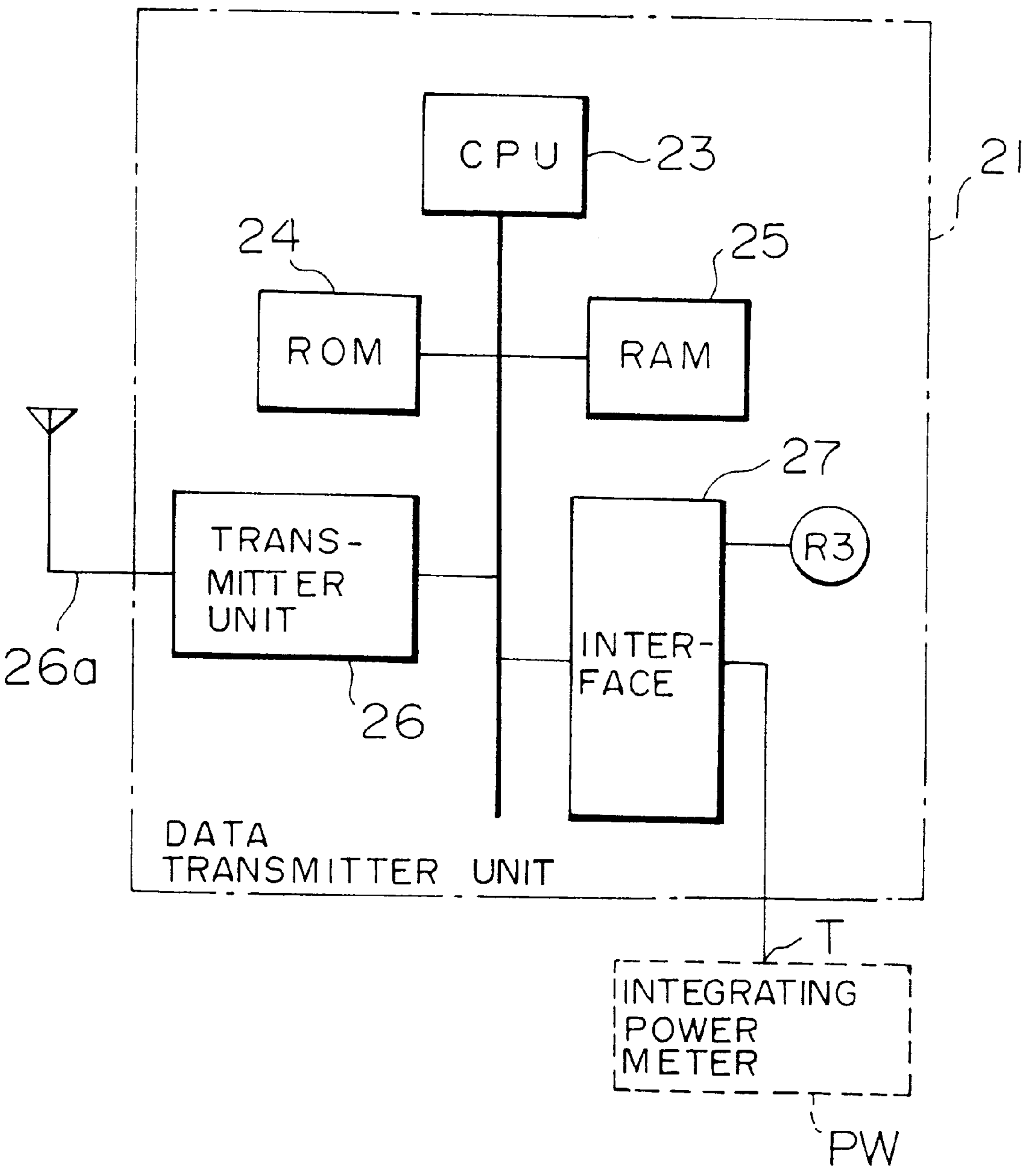
FIG. 8 is a block diagram showing a data transmitting unit shown in FIG. 1.

FIG. 8 shows a block diagram of the data transmitting unit 21. The data transmitting unit 21 includes a central processing unit (CPU) 23, a read-only memory (ROM) 24, a random access memory (RAM) 25, a transmitter 26, and an interface circuit 27. In addition, a relay switch R3 has a normally closed contact r3 which is inserted in the circuit of the battery 20 as shown in FIG. 7. Power consumption of a building is always integrated by, for example, an integrating wattmeter PW, and the integrated result is outputted as digital data from an output terminal T.

When the contact r2-2 shown in FIG. 7 is closed, the output voltage of the battery 20 is supplied as a supply voltage to the data transmitting unit 21, and each unit of the data transmitting unit 21 is activated. When supplied with a voltage, the CPU 23 reads data obtained at the terminal T of the integrating wattmeter PW through the interface 27, and sends the read data to the transmitter 26. The transmitter 26 transmits the data with a carrier in the air from an antenna 26*a*. The transmitted signal is received and demodulated by the receiver 7 shown in FIG. 2, and is recorded by the hard disk drive 6 through the CPU 3.

The CPU 23 (shown in FIG. 8) drives the relay switch R3 via the interface 27 when the transmitter 26 terminates transmission of data. The relay switch R3 is driven, then the contact r3 (FIG. 7) is open, and the coil power supply of the relay switch R2 is switched off. Thereby, the contact r2-2 is open, so the power supply of the data transmitting unit 21 is switched (disconnected) off.

Details of one embodiment of the present invention, shown in FIGS. 1 and 2, have been described. According to this embodiment, data obtained by the integrating wattmeter PW in the building can be collected from, for example, an automobile, without going to the place where the wattmeter PW is installed. In addition, until the phase of the SAW based on the signal received by the antenna 11 (FIG. 1) completely coincides with the tapping pattern 12*d* of the SAW correlator 12, the data transmitting unit 21 is not activated, and thus hardly malfunctions, which advantageously realizes high reliability. Also, until the relay switch R1 is activated, the circuit of the battery 20 is completely, mechanically broken by the contacts rl, r2-1 and r2-2. Hence, leakage power is theoretically zero, which causes power consumption of the battery 20 to be zero in standby mode.

Figure 9:
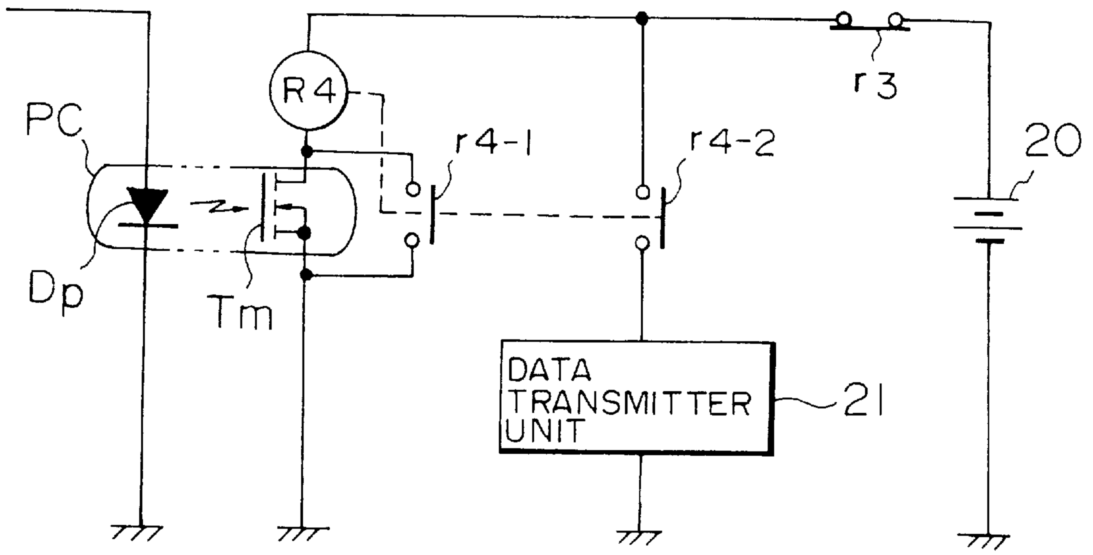
FIG. 9 is a circuit diagram showing a modification of the circuit shown in FIG. 7.

To improve sensitivity, a circuit shown in FIG. 9 may be used for the circuit shown in FIG. 7. This circuit in FIG. 9 includes a photocoupler PC comprised of a light-emitting diode Dp and a MOS phototransistor Tm, for the Zener diode Dz and the relay switch R1 in FIG. 7. According to this circuit, when the output voltage of the accumulation circuit 16 reaches the forward voltage of the light-emitting diode Dp or higher, the light-emitting diode Dp is switched on to emit light, which switches on the phototransistor Tm. Then, a relay switch R4 is activated to close contacts r4-1 and r4-2. Closing the contact r4-1 causes the self-holding of the relay switch R4. Closing the contact r4-2 causes the voltage of the battery 20 to be supplied to the data transmitting unit 21.

According to the circuit shown in FIG. 8, compared with the circuit in FIG. 7, lower output voltage of the accumulation circuit 16 can activate the relay switch R4. While the circuit in FIG. 8 is in standby mode, a leakage current flows through the relay switch R4 and the phototransistor Tm. However, the leakage current from the phototransistor Tm is 100 pA or less, thus, power consumption of the battery 20 in standby mode can be substantially reduced to approximately zero.

Figure 10:
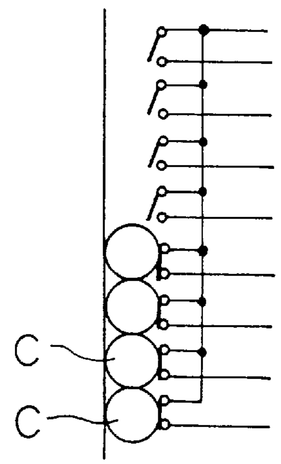
FIG. 10 is a schematic, cross-sectional view illustrating an example of a data collector for collecting the number (data) of sold juice cans.

The above-described embodiment can be applied not only to collection of data from the integrating wattmeter PW but also to collection of sales data from, for example, an automatic vending machine of juice cans. According to the latter case, as shown in FIG. 10, for example, switches are disposed along a storage of cans C, and when each can C is stored, the switch for the storing portion is turned on. Outputs from the respective switches may be read by the CPU 23 via the interface 27 shown in FIG. 8. Instead of using the switches, by providing a passage detector to a can receiving portion and by providing a mechanical counter to a can discharging portion so that the number of cans is counted whenever a can passes through the passage detector, the counted data may be read by the CPU 23 via the interface 27.

What is claimed is:

1. A radio data transmitter comprising:

a radio switching means including:

a receiving antenna for receiving a first radio signal; said first radio signal comprising a predetermined particular pattern;

a surface acoustic wave device for extracting said particular pattern in said first radio signal received by said receiving antenna;

an accumulation circuit for generating an output power accumulated from said surface acoustic wave device; and a switching circuit, activated when said output power from said accumulation circuit exceeds a predetermined value, wherein said accumulation circuit is activated in response to said first radio signal;

a data transmitter unit which is supplied with power in accordance with the activation of the radio switching means;

wherein said data transmitter unit transmits a second radio signal comprising predetermined carrier-modulated data from a transmitting antenna and subsequently power is disconnected to said data transmitter unit.

2. A radio data transmitter according to claim 1, wherein said surface acoustic wave device comprises a surface acoustic wave matched filter.

3. A radio data transmitter according to claim 2, wherein said comprises an $Al_2O_3$ substrate, an AlN film formed on said $Al_2O_3$ substrate, and an Al tapping pattern formed on said AlN film.

* * * * *

UNITED STATES PATENT AND TRADEMARK OFFICE
CERTIFICATE OF CORRECTION

PATENT NO. : 5,995,806
DATED : November 30, 1999
INVENTOR(S) : Kazuo Tsubouchi et al.

It is certified that error appears in the above-identified patent and that said Letters Patent is hereby corrected as shown below:

Title page,
Item [57], ABSTRACT,
Line 2, before "first" insert -- a --.
Line 4, delete "include" and substitute -- including -- in its place.
Line 7, delete "disconnect" and substitute -- disconnects -- in its place.

Column 6,
Line 28, after "said" insert -- surface acoustic wave matched filter --.

Signed and Sealed this

Eighth Day of October, 2002

*Attest:*

JAMES E. ROGAN

*Attesting Officer*

*Director of the United States Patent and Trademark Office*